(12) United States Patent
Grimes

(10) Patent No.: US 10,562,465 B2
(45) Date of Patent: Feb. 18, 2020

(54) LENS DEVICE INCLUDING A LENS RETAINER WITH ADHESIVE AREA FOR CONNECTING SAID LENS DEVICE TO A CAMERA HOUSING OF A MOTOR VEHICLE CAMERA, CAMERA, MOTOR VEHICLE, AND METHOD

(71) Applicant: Connaught Electronics Limited, Tuam, County Galway (IE)

(72) Inventor: John Grimes, Tuam (IE)

(73) Assignee: Connaught Electronics Limited, Tuam, County Galway (IE)

( * ) Notice: Subject to any disclaimer, the term of this patent is extended or adjusted under 35 U.S.C. 154(b) by 0 days.

(21) Appl. No.: 15/768,126

(22) PCT Filed: Oct. 14, 2016

(86) PCT No.: PCT/EP2016/074746
§ 371 (c)(1),
(2) Date: Apr. 13, 2018

(87) PCT Pub. No.: WO2017/064268
PCT Pub. Date: Apr. 20, 2017

(65) Prior Publication Data
US 2018/0304824 A1   Oct. 25, 2018

(30) Foreign Application Priority Data

Oct. 16, 2015   (DE) .................. 10 2015 117 611

(51) Int. Cl.
*H04N 5/225*   (2006.01)
*B60R 11/04*   (2006.01)
(Continued)

(52) U.S. Cl.
CPC ............ *B60R 11/04* (2013.01); *G02B 7/02* (2013.01); *G03B 17/12* (2013.01); *H04N 5/2252* (2013.01);
(Continued)

(58) Field of Classification Search
CPC ......... H04N 5/2252; G02B 7/02; B60R 11/04
(Continued)

(56) References Cited

U.S. PATENT DOCUMENTS 5,831,777 A   11/1998   Iwasa
2008/0100932 A1   5/2008   Noda et al.
(Continued)

FOREIGN PATENT DOCUMENTS

EP   1 986 420 A2   10/2008
EP   2 881 774 A1   6/2015
(Continued)

OTHER PUBLICATIONS

International Search Report issued in PCT/EP2016/074746 dated Dec. 22, 2016 (3 pages).
(Continued)

*Primary Examiner* — Usman A Khan
(74) *Attorney, Agent, or Firm* — Osha Liang LLP

(57) ABSTRACT

The invention relates to a lens device (9) for a camera (4) of a motor vehicle (1), including at least one lens (11) and including a lens retainer (10) for retaining the at least one lens (11), wherein the lens retainer (10) has an adhesive area (16) at an outside, to which an adhesive (14) can be applied for connecting the lens device (9) to a camera housing (15) of the camera (4), wherein the lens retainer (9) has a base surface (19) and a plurality of elevations (21) in the adhesive area (16), wherein the respective elevations (21) are formed raised to the base surface (19).

11 Claims, 4 Drawing Sheets

Figure 1:
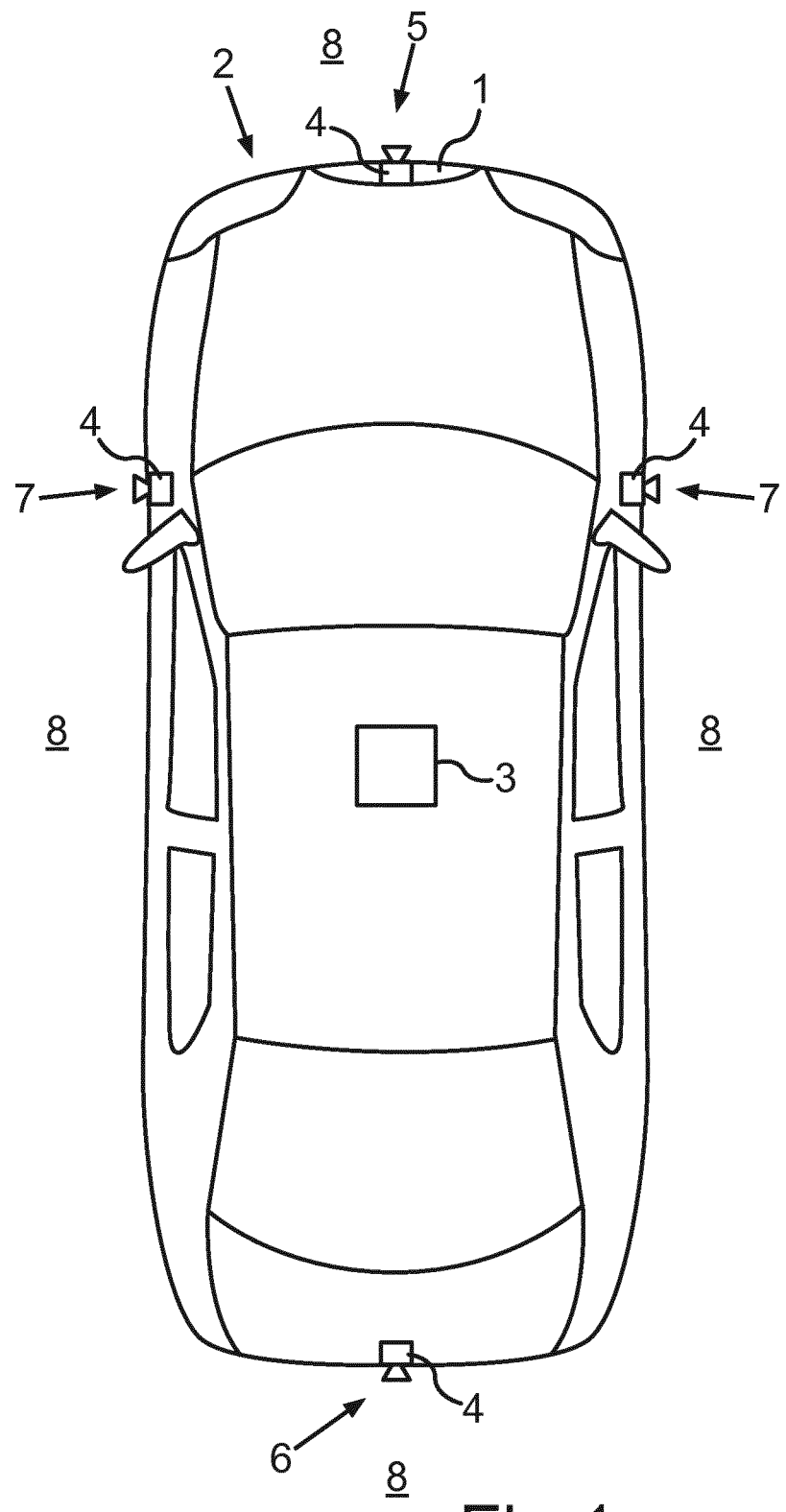

(51) Int. Cl.
*G03B 17/12* (2006.01)
*G02B 7/02* (2006.01)
(52) U.S. Cl.
CPC ......... *H04N 5/2254* (2013.01); *H04N 5/2257* (2013.01)
(58) Field of Classification Search
USPC .......................................................... 348/373
See application file for complete search history.

(56) References Cited

U.S. PATENT DOCUMENTS

| | | | |
|---|---|---|---|
| 2008/0239522 A1 | 10/2008 | Kinoshita et al. | |
| 2009/0079863 A1 | 3/2009 | Aoki et al. | |
| 2009/0244736 A1 | 10/2009 | Sasaki | |
| 2011/0032416 A1* | 2/2011 | Naito | H04N 5/2253 348/374 |
| 2012/0019940 A1 | 1/2012 | Lu et al. | |
| 2015/0124098 A1 | 5/2015 | Winden et al. | |
| 2015/0156381 A1 | 6/2015 | Oba | |

FOREIGN PATENT DOCUMENTS

| | | |
|---|---|---|
| JP | 2009-301054 A | 12/2009 |
| KR | 2013/0119195 A | 10/2013 |
| KR | 20130119195 A * | 10/2013 |
| WO | 2011/076634 A1 | 6/2011 |

OTHER PUBLICATIONS

Written Opinion issued in PCT/EP2016/074746 dated Dec. 22, 2016 (7 pages).
German Search Report issued in Application No. 10 2015 117 611A prepared on Jun. 20, 2016 (10 pages).

* cited by examiner

LENS DEVICE INCLUDING A LENS RETAINER WITH ADHESIVE AREA FOR CONNECTING SAID LENS DEVICE TO A CAMERA HOUSING OF A MOTOR VEHICLE CAMERA, CAMERA, MOTOR VEHICLE, AND METHOD

The present invention relates to a lens device for a camera of a motor vehicle with at least one lens and with a lens retainer for retaining the at least one lens, wherein the lens retainer has an adhesive area at an outside, to which an adhesive can be applied for connecting the lens device to a camera housing of the camera. Moreover, the present invention relates to a camera for a motor vehicle having such a lens device. Moreover, the present invention relates to a motor vehicle with such a camera. Finally, the present invention relates to a method for producing a camera for a motor vehicle.

Presently, the interest is in particular directed to cameras for a motor vehicle. Such cameras can for example be a part of a driver assistance system of the motor vehicle, by which an environmental region of the motor vehicle can be captured. For this purpose, multiple cameras can be disposed distributed at an outside of the motor vehicle. The environmental region captured by the cameras can then be presented to the driver for example on a corresponding display device. In this manner, the driver can be assisted in driving the motor vehicle.

The cameras include a camera housing, which is usually two-part formed, for example can be formed of aluminum. In the interior of the camera housing, at least one circuit board can be disposed, on which the electronic components of the camera are disposed. An image sensor of the camera can also be disposed on this at least one circuit board. Moreover, the camera for example has a lens device. This lens device includes at least one lens as well as a lens retainer for retaining the at least one lens. For attaching the lens device to the camera housing, the lens device can be inserted into a corresponding opening of the camera at least in certain areas. The area of the lens device, which is disposed outside of the camera, has an adhesive area, to which an adhesive can be applied. In this manner, the lens device and the camera housing can be connected to each other by means of the adhesive.

In this context, US 2011/0032416 A1 describes a camera device, which has a lens block and a substrate, on which an image sensor is disposed. The lens block includes a support block, which can be connected to the substrate by means of an adhesive connection. The support block has a plurality of recesses, into which the adhesive is introduced. Thus, the adhesive connection between the support block and the substrate can be improved.

It is the object of the present invention to demonstrate a solution, how in a camera for a motor vehicle a more reliable connection between a lens device and a camera housing can be allowed.

According to the invention, this object is solved by a lens device, by a camera, by a motor vehicle as well as by a method having the features according to the respective independent claims. Advantageous implementations of the present invention are the subject matter of the dependent claims, of the description and of the figures.

A lens device according to the invention for a camera of a motor vehicle includes at least one lens. Moreover, the lens device includes a lens retainer for retaining the at least one lens. The lens retainer has an adhesive area at its outside, to which an adhesive can be applied for connecting the lens device to a camera housing of the camera. Moreover, the lens retainer has a base surface and a plurality of elevations in the adhesive area, wherein the respective elevations are formed raised to the base surface.

The lens device can be employed in a camera for a motor vehicle. The lens device includes the lens retainer. This lens retainer can for example be manufactured of a metal, for example aluminum. In an interior of the lens retainer, the at least one lens can be disposed. Multiple lenses can also be disposed in the interior of the lens retainer at least in certain areas. In producing the camera, the lens device can be introduced into a corresponding opening of the camera housing at least in certain areas. Therein, a part of the lens device, which can also be referred to as a cap element, is disposed outside of the camera housing. At the outside of the lens retainer in the area of the cap element, an adhesive area is provided. A corresponding adhesive can be applied to this adhesive area, and thus an adhesive connection between the lens retainer and the camera housing can be provided.

According to the invention, it is now provided that the lens retainer has the base surface and a plurality of elevations in the adhesive area. These elevations are each formed raised to the base surface. In other words, the respective elevations extend starting from the base surface. Compared to lens devices and lens retainers from the prior art, respectively, which only have a base surface in the adhesive area, thus, more reliable adhesive connection between the lens device and the camera housing can be provided. In lens devices having only the base surface in the adhesive area, an adhesive connection between two smooth surfaces is present, namely the base surface and the corresponding connecting area of the camera housing. Here, experiments have shown that adhesive is for example completely detached from the base surface if a tensile force at a predetermined angle is exerted on the lens device. In that corresponding elevations are now provided in the adhesive area, the adhesive surface of the lens device in contact with the adhesive can be increased. Thus, it can be achieved that the adhesive adheres more reliably to the adhesive area of the lens device after curing. In this manner, a more reliable adhesive connection between the lens device and the camera housing can overall be provided.

Preferably, each of the elevations has a first adhesive surface, which is disposed parallel to the base surface, and a second adhesive surface, which is disposed obliquely to the base surface. Thus, the respective elevations can be formed such that the first adhesive surface is disposed substantially parallel to the base surface. The first adhesive surface can be associated with the area of the respective elevation, which is farthest away from the base surface. Moreover, each of the elevations can have at least a second adhesive surface, which is disposed obliquely to the base surface. It can also be provided that the second adhesive surface is disposed substantially perpendicularly to the base surface. Thus, starting from the adhesive surfaces of the respective elevations, to which adhesive is applied, adhesive forces are applied in different directions. By the second adhesive surfaces disposed obliquely to the base surface, thus, adhesive surfaces can also be provided obliquely to the base surface. Thus, a reliable adhesive connection between the lens device and the camera housing can be provided even if a force is exerted on the lens device obliquely to this base surface.

In an embodiment, the elevations each have a transitional area, which is disposed between the first adhesive surface and the second adhesive surface, and the first transitional area has a predetermined curvature. In other words, the respective elevations do not have sharp edges in the transitional area between the first and the second adhesive surface. The edges in the transitional area between the first adhesive surface and the second surface are therefore correspondingly rounded. By this shaping of the elevations, it can be achieved that voids or air pockets do not form in the first transitional area. Thus, uniform distribution of the adhesive in the adhesive area can be allowed. Thereby, reliable adhesive connection between the lens device and the camera housing can be allowed.

Furthermore, it is advantageous if the elevations each have a second transitional area, which is disposed between the second adhesive surface and the base surface, and the second transitional area has a predetermined curvature. In the second transitional area between the elevations and the base surface too, it is provided that sharp edges are not present. For example, it can be provided that the first transitional area and the second transitional area have the same predetermined curvature. Thus, in the second transitional area too, voids can be prevented from forming and thus reliable adhesive connection can be provided.

In a further configuration, the base surface is annularly formed and the plurality of elevations is disposed uniformly spaced from each other along a circumferential direction of the base surface. The base surface or the outside of the lens retainer, with which the base surface is associated, can be substantially annularly formed. In that the elevations, which extend starting from the base surface, are disposed uniformly spaced from each other, it can be achieved that an increased surface is provided in the entire adhesive area. Moreover, the same adhesive force can be provided in the entire adhesive area. Thus, the reliability of the adhesive connection between the lens device and the camera housing can be improved.

In a further embodiment, the plurality of elevations each has a main extension direction in radial direction of the base surface and the respective elevations have a consistent cross-sectional area along the main extension direction. The respective elevations can be formed such that they each extend along the radial direction of the base surface. In addition, the cross-sectional area of the respective elevations is constant in the main extension direction. In other words, the cross-sectional area of the respective elevations does not vary. Since the base surface is substantially circularly formed, the respective elevations extend starting from the center of the annulus in radial direction. By this arrangement, it can for example be allowed that the adhesive disposed between adjacent elevations can be completely exposed to a corresponding radiation, in particular UV radiation, during curing. If for example a UV radiation source radiates to the adhesive area from the outside, the entire adhesive can be irradiated with the UV radiation. Thus, it can be achieved that the adhesive completely cures.

In a further configuration, the plurality of elevations is formed in a predetermined area of the base surface. For example, the elevations can be formed in that area of the base surface, which faces the inner circle of the circular base surface. If the adhesive is irradiated with a UV radiation source, the beam path can extend from the outer circle to the inner circle. Thus, the adhesive is present all over on the base surface in an area between the outer circle and the elevations. In the area adjoining to it, the elevations are then formed. Thus, it can be achieved that the adhesive in the beam path and the adhesive between the elevations is completely cured.

In a further configuration, the lens retainer has a retaining element and a cap element, which are each cylindrically formed and are disposed one behind the other in axial direction of the lens retainer, wherein the cap element has a larger diameter compared to the retaining element and wherein the adhesive area is associated with the area of the outside of the cap element, which adjoins to the retaining element. In the arrangement of the lens device or the lens retainer on the camera housing, the retaining element can be inserted into the opening of the camera housing corresponding thereto. The cap element having a larger diameter compared to the retaining element is disposed outside of the camera housing. The adhesive area is associated with the area of the outside of the cap element, which faces the camera housing and which adjoins to the retaining element. This area, which includes the base surface, is then annularly formed.

A camera according to the invention for a motor vehicle includes a lens device according to the invention. Moreover, the camera includes a camera housing. The camera housing can for example be two-part formed and be manufactured of aluminum. In the interior of the camera housing, the electronics of the camera and an image sensor of the camera can then be disposed. The camera can have a motor vehicle fixing device for fixing the camera to the motor vehicle.

A motor vehicle according to the invention includes at least one camera according to the invention. It can also be provided that the motor vehicle includes a plurality of cameras, which are for example disposed distributed on the motor vehicle. An environmental region of the motor vehicle can for example be captured by the cameras. Therein, the image sequences or video data provided by the respective cameras, which describe the environmental region, can be presented on a display device of the motor vehicle.

A method according to the invention for producing a camera for a motor vehicle includes providing a lens device according to the invention. Moreover, a camera housing is provided. Furthermore, an adhesive is applied to the adhesive area of the lens retainer of the lens device and the lens device is connected to the camera housing by means of the adhesive.

Preferably, the adhesive is irradiated with radiation in the ultraviolet wavelength range for curing. For example, the adhesive can be applied to the adhesive area of the lens device or the lens retainer in the liquid state. Subsequently, the lens device can be disposed in the corresponding opening of the camera housing at least in certain areas. Subsequently, the lens device can then be adjusted to the image sensor disposed in the interior of the camera housing. After adjusting, the adhesive can be cured with UV radiation. Subsequently, the camera or the camera housing and the lens housing connected by the adhesive, can be introduced into a corresponding furnace, where the adhesive is completely cured. By the configuration of the adhesive surface having the elevations, a reliable adhesive connection between the lens device and the camera housing can be provided. In addition, by the configuration of the elevations, it can be guaranteed that the adhesive completely cures upon the irradiation with the UV radiation.

The preferred embodiments presented with respect to the lens device according to the invention and the advantages thereof correspondingly apply to the camera according to the invention, to the motor vehicle according to the invention as well as to the method according to the invention.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations or alone, without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not have all of the features of an originally formulated independent claim.

Now, the invention is explained in more detail based on preferred embodiments as well as with respect to the attached drawings.

Figure 2:
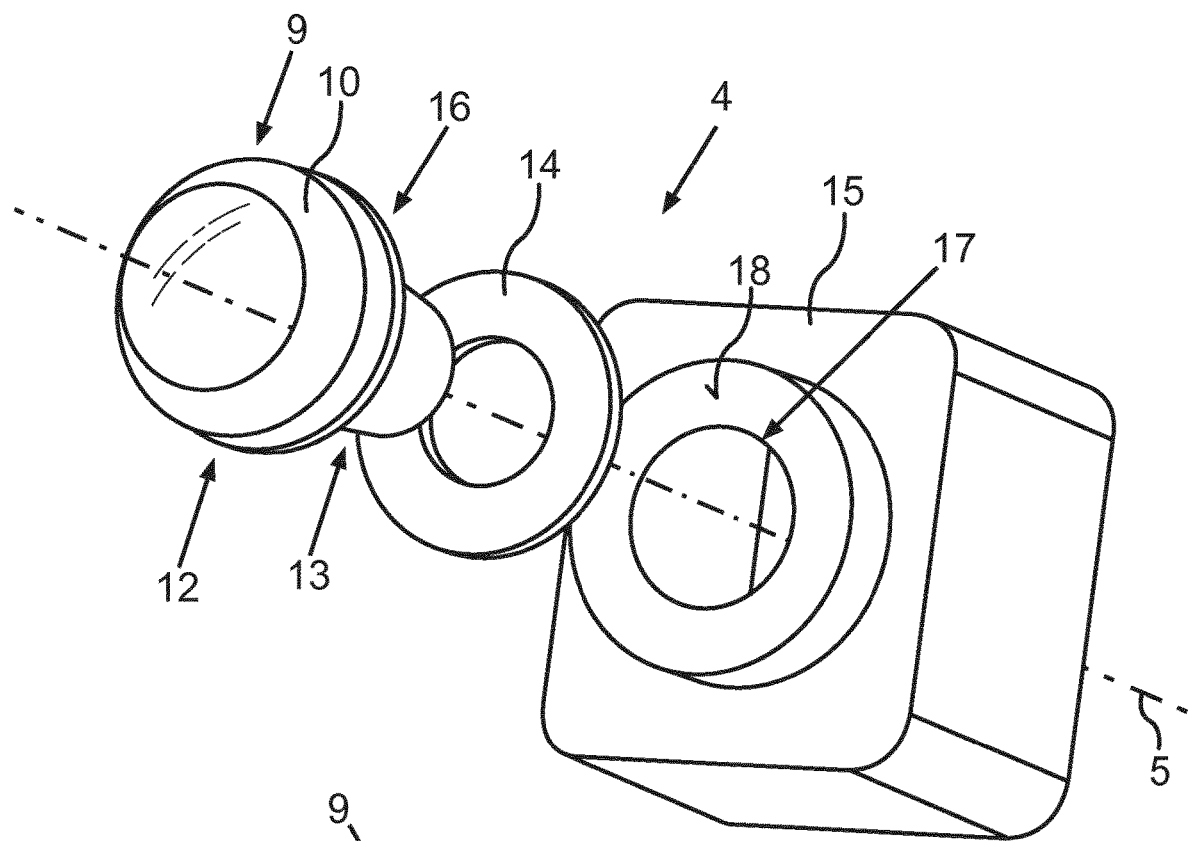
Figure 3:
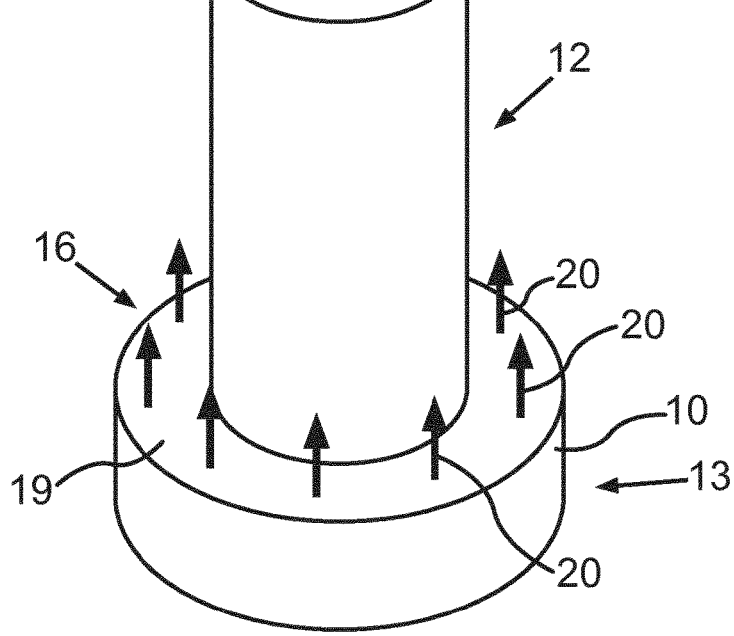
Figure 4:
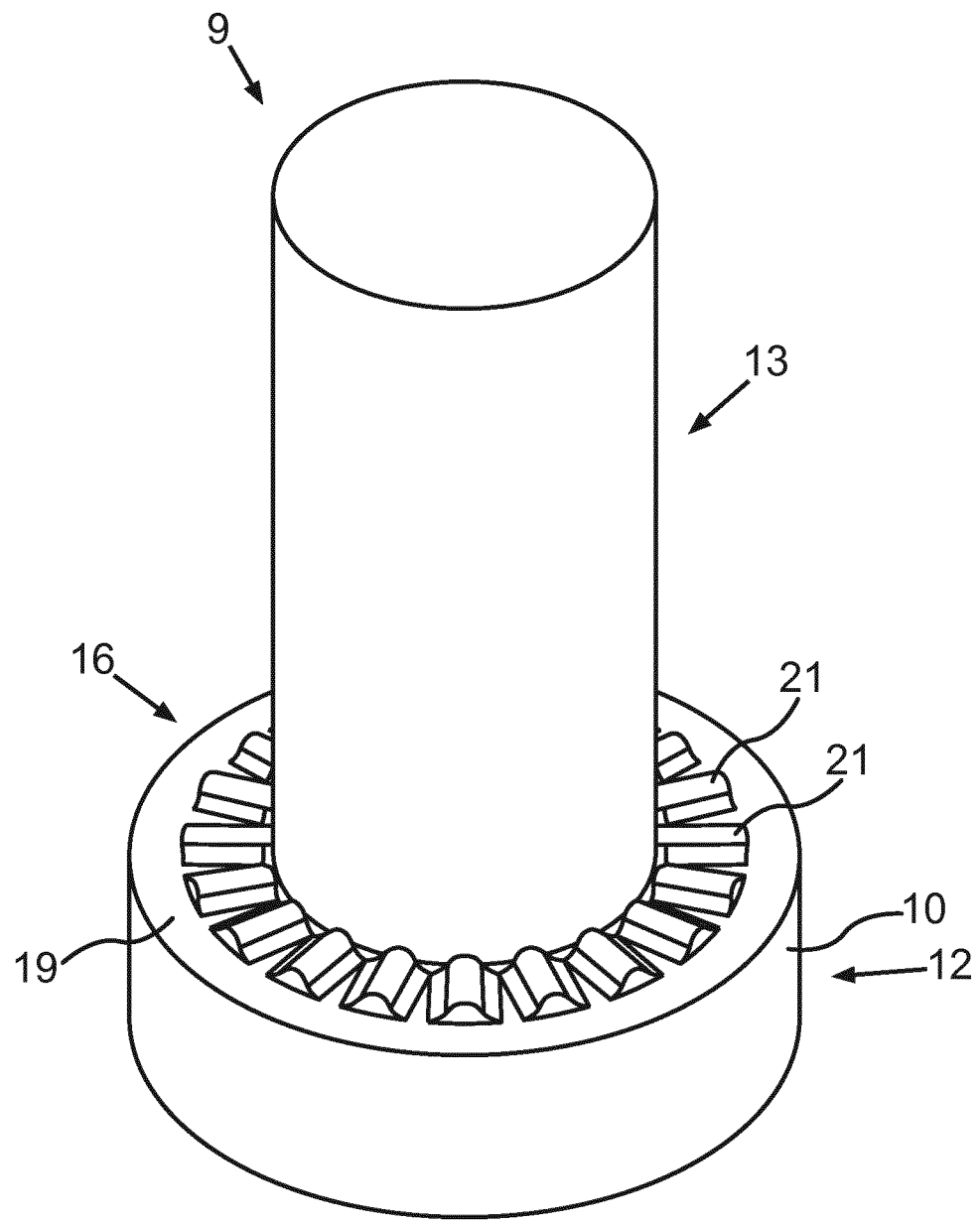
Figure 5:
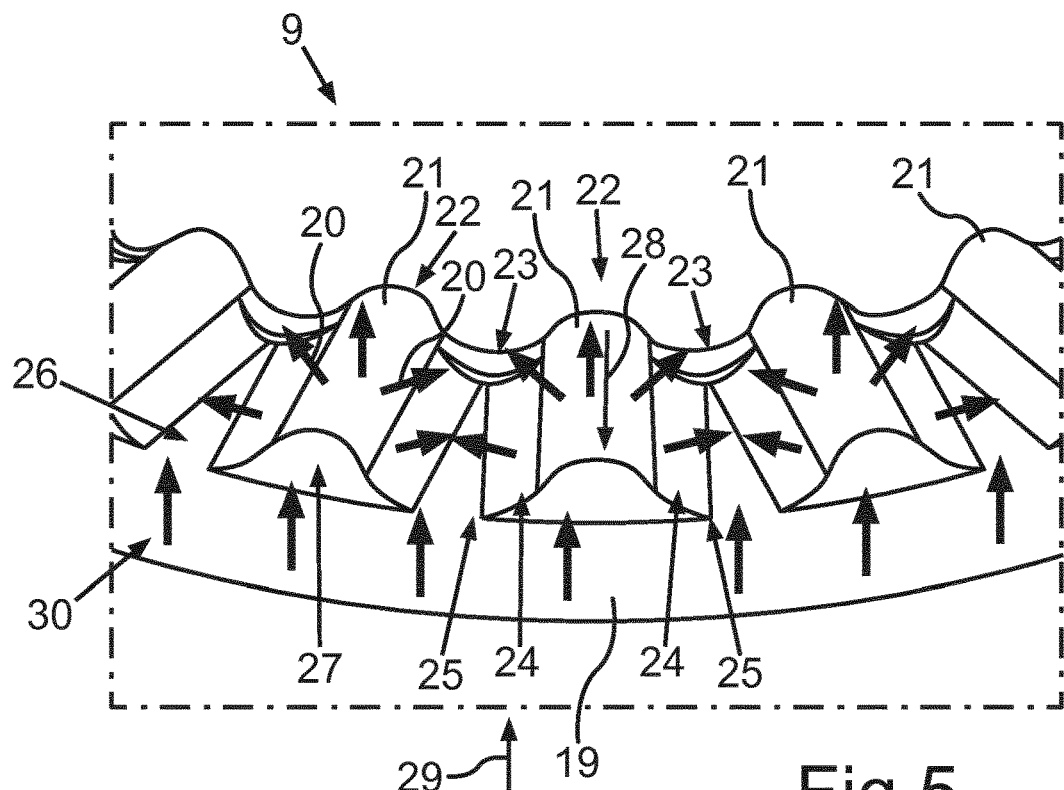

There show:

FIG. 1 a motor vehicle according to an embodiment of the present invention, which includes a plurality of cameras;

FIG. 2 a camera, which includes a camera housing and a lens device, in an exploded view;

FIG. 3 a lens device according to the prior art in a perspective view;

FIG. 4 a lens device according to an embodiment of the present invention in a perspective view;

FIG. 5 an enlarged illustration of FIG. 4; and

Figure 6:
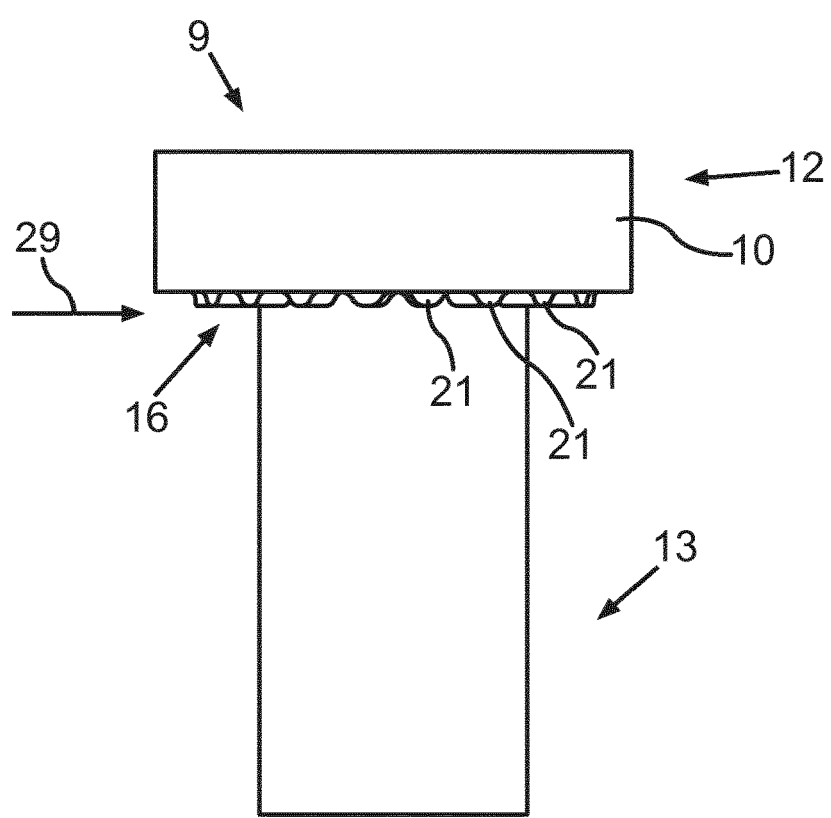

FIG. 6 the lens device according to FIG. 4 in a side view.

In the figures, identical and functionally identical elements are provided with the same reference characters.

FIG. 1 shows a motor vehicle 1 according to an embodiment of the present invention in a plan view. The motor vehicle 1 is formed as a passenger car in the present case. The motor vehicle 1 includes a driver assistance system 2, which in turn includes a control device 3. The control device 3 can for example be constituted by an electronic control unit of the motor vehicle 1.

Moreover, the motor vehicle 1 or the driver assistance system 2 includes at least one camera 4. In the present embodiment, the motor vehicle 1 includes four cameras 4, which are disposed distributed on the motor vehicle 1. Presently, one of the cameras 4 is disposed in a rear area 5, one of the cameras 4 is disposed in a front area 7 and the remaining two cameras 4 are disposed in a respective lateral area 6, in particular in an area of the wing mirrors. The four cameras 4 are preferably formed identical in construction. Presently, the number and the arrangement of the cameras 4 are to be purely exemplarily understood.

An environmental region 8 of the motor vehicle 1 can be captured by the cameras 4. In particular, an image sequence or video data can be provided by the cameras 4, which describes the environmental region 8. This video data can be transmitted from the cameras 4 to the control device 3. A display device of the motor vehicle 1 not illustrated here can be controlled by means of the control device 3 such that the video data of the cameras 4 can be displayed to the driver.

FIG. 2 shows one of the cameras 4 in an exploded illustration. The camera 4 includes a lens device 9, which in turn includes a lens retainer 10. At least one lens 11 of the lens device 9 can be retained by the lens retainer 10. Presently, a lens 11 is disposed in an interior of the lens retainer 10 at least in certain areas. The lens device 9 includes a cap element 12 as well as a retaining element 13.

Moreover, the camera 4 includes a camera housing 15, in which the electronics of the camera 4 and an image sensor of the camera 4 can be disposed. The camera housing 15 has an opening 17 corresponding to the retaining element 13. In producing the camera 4, the lens device 9 can be introduced into the camera housing 15 at least in certain areas. In connecting the lens device 9 to the camera housing 15, the retaining element 13 is disposed within the opening 17 of the camera housing 15 and the cap element 12 is outside of the camera housing 15. To connect the lens device 9 to the camera housing 15, an adhesive 14 is used. This adhesive 14 is applied to an adhesive area 16 of the lens device 9. Thus, an adhesive connection between the adhesive area 16 of the lens device 9 and a connecting area 18 of the camera housing 15 can be provided.

FIG. 3 shows a lens device 9 according to the prior art in a perspective view. Therein, it is apparent that the cap element 12 has a larger diameter compared to the retaining element 13. Moreover, the adhesive area 16 is apparent, which is formed by the area at the outside of the lens retainer 10 or the cap element 12, which is disposed in the connecting area 18 of the camera housing 15. Presently, the lens retainer 10 or the cap element 12 has a base surface 19 in the adhesive area 16, which is annularly formed. The adhesive 14 can then be applied to this base surface 19. Therein, the adhesive force 20 provided by the adhesive 14 only acts in a direction perpendicularly to the base surface 19. If a force is exerted on the lens device 9 in the assembled state of the camera 4, which is formed obliquely to this adhesive force 20, it can be the case that the adhesive 14 completely detaches from the base surface 19.

FIG. 4 shows a lens device 9 according to an embodiment of the present invention in a perspective view. Therein, a plurality of elevations 21 is formed in the adhesive area 16. These elevations 21 extend starting from the base surface 19. Therein, the respective elevations 21 are disposed uniformly spaced from each other along a circumferential direction of the base surface 19. Moreover, the elevations 21 are formed such that the main extension directions 28 of the respective elevations 21 extend in radial direction of the base surface 19. By the elevations 21, compared to the adhesive surface 16 according to FIG. 3, which only has the base surface 19, an increased surface can be achieved. In this manner, the adhesive connection between the lens device 9 and the camera housing 15 can be improved.

FIG. 5 shows an enlarged view of the lens device 9 according to FIG. 4. Herein, it is apparent that the respective elevations 21 have a first adhesive surface 22, which is disposed substantially parallel to the base surface 19. Moreover, the respective elevations 21 include second adhesive surfaces 23, which are disposed obliquely to the base surface 19. Between the respective first adhesive surfaces 22 and the second adhesive surfaces 23, a first transitional area 24 is formed, which has a predetermined curvature. In addition, a second transitional area 25 also having a predetermined curvature is formed between the second adhesive surfaces 23 and the base surface 19. By the curvatures in the transitional areas 24, 25, the adhesive 14 applied to the elevations 21 can be prevented from having corresponding voids or air bubbles. By the adhesive surfaces 22, 23 as well as the transitional areas 24, 25, adhesive forces 20 can be provided in different directions. Thus, the adhesive connection between the lens device 9 and the camera housing 15 can be improved.

Presently, the elevations 21 are formed in a predetermined area of the base surface 19. Therein, an area 30 of the base surface 19 is free of elevations 21. As already explained, the respective elevations 21 are disposed in radial direction of the base surface 19. In addition, the cross-sectional areas 27 of the elevations are constant along the main extension direction 28. Thus, it can be achieved that the adhesive 14 disposed between the elevations 21 can be completely irradiated by means of UV radiation. If the radiation is for example emitted along the direction 29, it can be achieved that the adhesive 14 is completely illuminated.

FIG. 6 shows the lens device 9 according to FIG. 4 in a side view. Herein, the wave-shaped structure of the elevations 21 disposed next to each other is apparent. Further, it is apparent that UV radiation, which is for example introduced along the direction 29, can completely irradiate the adhesive 14 between the elevations 21. Therein, it can be provided that the adhesive 14 is first irradiated with the UV radiation. This can for example be effected after the lens device 9 or the at least one lens 11 has been adjusted to the image sensor. Subsequent thereto, the adhesive can be completely cured in a furnace.

The invention claimed is:

1. A lens device for a camera of a motor vehicle comprising:
   at least one lens; and
   a lens retainer for retaining the at least one lens,
   wherein the lens retainer has an adhesive area at an outside, to which an adhesive is applied for connecting the lens device to a camera housing of the camera,
   wherein the lens retainer has a base surface and a plurality of elevations in the adhesive area,
   wherein the respective elevations are formed raised to the base surface and the elevations each have a first transitional area, which is disposed between a first adhesive surface and a second adhesive surface,
   wherein the first transitional area has a predetermined curvature,
   wherein each of the elevations has a first adhesive surface, which is disposed parallel to the base surface, and a second adhesive surface, which is disposed obliquely to the base surface, and
   wherein the plurality of elevations are disposed uniformly spaced from each other along a circumferential direction of the base surface and the respective elevations have a main extension direction in a radial direction of the base surface.

2. The lens device according to claim 1, wherein the elevations each have a second transitional area, which is disposed between the second adhesive surface and the base surface, and the second transitional area has a predetermined curvature.

3. The lens device according to claim 1, wherein the base surface is annularly formed.

4. The lens device according to claim 3, wherein the plurality of elevations each has a a consistent cross-sectional area along the main extension direction.

5. The lens device according to claim 1, wherein the plurality of elevations is formed in a predetermined area of the base surface.

6. The lens device according to claim 1, wherein the lens retainer has a retaining element and a cap element, which are each cylindrically formed and are disposed one behind the other in axial direction of the lens retainer, wherein the cap element has a larger diameter compared to the retaining element and wherein the adhesive area is associated with the area of the outside of the cap element, which adjoins to the retaining element.

7. A camera for a motor vehicle with a lens device according to claim 1 and with a camera housing.

8. A motor vehicle with at least one camera according to claim 7.

9. A method for producing a camera for a motor vehicle, comprising:
   providing a lens device according to claim 1;
   providing a camera housing;
   applying an adhesive to the adhesive area of the lens retainer of the lens device and the lens device is connected to the camera housing by the adhesive.

10. The method according to claim 9, further comprising: irradiating the adhesive with radiation in the ultraviolet wavelength range for curing.

11. The lens device according to claim 1,
    wherein the lens retainer retains the at least one lens through direct contact with the at least one lens,
    wherein an interior of the camera housing comprises at least one circuit board, and
    wherein an image sensor of the camera and electronic components of the camera are disposed on the at least one circuit board.

* * * * *